US010916992B2

(12) United States Patent
Yamaguchi et al.

(10) Patent No.: US 10,916,992 B2
(45) Date of Patent: Feb. 9, 2021

(54) DRIVE DEVICE (71) Applicant: Nidec Corporation, Kyoto (JP)

(72) Inventors: Yasuo Yamaguchi, Kyoto (JP); Yuki Ishikawa, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 16/323,643

(22) PCT Filed: Aug. 7, 2017

(86) PCT No.: PCT/JP2017/028551
§ 371 (c)(1),
(2) Date: Feb. 6, 2019

(87) PCT Pub. No.: WO2018/030324
PCT Pub. Date: Feb. 15, 2018

(65) Prior Publication Data
US 2019/0207481 A1 Jul. 4, 2019

Related U.S. Application Data

(60) Provisional application No. 62/372,411, filed on Aug. 9, 2016, provisional application No. 62/402,027, filed
(Continued)

(30) Foreign Application Priority Data

Mar. 31, 2017 (JP) .................. 2017-072170

(51) Int. Cl.
*H02K 9/193* (2006.01)
*H02K 5/20* (2006.01)
(52) U.S. Cl.
CPC ............... *H02K 9/193* (2013.01); *H02K 5/20* (2013.01)

(58) Field of Classification Search
CPC .................... H02K 9/19; H02K 5/20
(Continued)

(56) References Cited

U.S. PATENT DOCUMENTS 6,039,551 A    3/2000   Takeuchi et al.
6,116,877 A    9/2000   Takeuchi et al.
(Continued)

FOREIGN PATENT DOCUMENTS

CN          205429978 U     8/2016
DE    11 2009 000 491 T5    3/2011
(Continued)

OTHER PUBLICATIONS

Machine Translation JP2010004603 (Year: 2010).*
(Continued)

*Primary Examiner* — Jose A Gonzalez Quinones
(74) *Attorney, Agent, or Firm* — Keating & Bennett (57) ABSTRACT

A drive device includes a rotor, a stator, a housing including an accommodation portion to store oil, a pump driven through a motor shaft, and a transmission that transmits rotation of the motor shaft to a pump shaft. The pump includes an external gear fixed to the pump shaft, an internal gear surrounding the external gear and meshing with the external gear, a pump room provided in the housing and accommodating the internal gear and the external gear, a suction port through which the oil is to be sucked into the pump room, and a discharge port through which the oil is to be discharged from the pump room. The housing includes a first oil passage connected to the discharge port. The motor shaft includes a second oil passage provided in the motor shaft and connected to the first oil passage and a first through-hole connecting the second oil passage and an outer circumferential surface of the motor shaft. The suction port is open to a lower region in a vertical direction of the
(Continued)

accommodation portion, and allows the oil in the accommodation portion to be sucked into the pump room.

10 Claims, 3 Drawing Sheets

Related U.S. Application Data on Sep. 30, 2016, provisional application No. 62/439,201, filed on Dec. 27, 2016.

(58) Field of Classification Search
USPC ............ 310/54, 75 R, 52, 98, 99, 119
See application file for complete search history.

(56) References Cited

U.S. PATENT DOCUMENTS

| | | | |
|---|---|---|---|
| 6,227,828 | B1 | 5/2001 | Takeuchi et al. |
| 7,211,913 | B2 | 5/2007 | Tsutsui et al. |
| 7,828,095 | B2 | 11/2010 | Murata et al. |
| 9,441,628 | B2 | 9/2016 | Sakata et al. |
| 9,762,106 | B2 | 9/2017 | Gauthier et al. |
| 2004/0200350 | A1 | 10/2004 | Makino et al. |
| 2007/0178292 | A1 | 8/2007 | Hasegawa et al. |
| 2011/0011203 | A1 | 1/2011 | Yamamoto et al. |
| 2013/0145879 | A1 | 6/2013 | Nakamura et al. |
| 2016/0153546 | A1 | 6/2016 | Ogawa et al. |
| 2016/0164378 | A1 | 6/2016 | Gauthier et al. |
| 2016/0332521 | A1 | 11/2016 | Suzuki |
| 2017/0227006 | A1 | 8/2017 | Lewis et al. |

FOREIGN PATENT DOCUMENTS

| | | | | | |
|---|---|---|---|---|---|
| JP | 62-29487 | U | | 2/1987 | |
| JP | 2010-004603 | A | | 1/2010 | |
| JP | 2010004603 | A | * | 1/2010 | |
| JP | 2010-252521 | A | | 11/2010 | |
| JP | 2011-004487 | A | | 1/2011 | |
| JP | 2011004487 | A | * | 1/2011 | |
| JP | 2013-055728 | A | | 3/2013 | |
| JP | 2016-101042 | A | | 5/2016 | |
| JP | 2016111918 | A | * | 6/2016 | ............ B60K 11/02 |
| JP | 2016-181954 | A | | 10/2016 | |
| JP | 2017-063542 | A | | 3/2017 | |

OTHER PUBLICATIONS

Machine Translation JP2016111918 (Year: 2016).*
Machine Translation JP20111004487 (Year: 2011).*
Migita et al., "Drive Device", U.S. Appl. No. 16/323,632, filed Feb. 6, 2019.
Yamaguchi et al., "Drive Apparatus", U.S. Appl. No. 16/323,633, filed Feb. 6, 2019.
Yamaguchi et al., "Drive Apparatus", U.S. Appl. No. 16/323,636, filed Feb. 6, 2019.
Yamaguchi, "Drive Device", U.S. Appl. No. 16/323,638, filed Feb. 6, 2019.
Yamaguchi, "Drive Device", U.S. Appl. No. 16/323,640, filed Feb. 6, 2019.
Yamaguchi, "Drive Device", U.S. Appl. No. 16/323,641, filed Feb. 6, 2019.
Official Communication issued in International Patent Application No. PCT/JP2017/028551, dated Nov. 21, 2017.

* cited by examiner

DRIVE DEVICE

BACKGROUND OF THE INVENTION

1. Field of the Invention

The present disclosure relates to a drive device.

2. Description of the Related Art

There is known a rotary electric machine including a case in which a lubricating fluid for lubrication and cooling of a stator, a rotor, and the like, is stored.

In some cases, a pump that sucks up oil stored in the case is provided in the rotary electric machine. The oil is sucked up by the pump to supply the oil to the rotor and the stator, which allows the rotor and the stator to be cooled. However, when the pump is simply provided in the rotary electric machine, it is necessary to provide an oil passage through which the oil flows, so that a structure of the rotary electric machine tends to be complicated to occasionally enlarge the rotary electric machine.

SUMMARY OF THE INVENTION

A drive device according to an example embodiment of the present disclosure includes a rotor including a motor shaft disposed along a center axis extending in one direction; a stator radially opposed to the rotor with a gap interposed therebetween; a housing including an accommodation portion to store oil and accommodate the rotor and the stator; a pump including a pump shaft disposed along an axis different from the center axis in the housing, the pump being driven through the motor shaft; and a transmission that transmits rotation of the motor shaft to the pump shaft. The pump includes an external gear fixed to the pump shaft; an internal gear surrounding the external gear and meshing with the external gear; a pump room provided in the housing and accommodating the internal gear and the external gear; a suction port through which the oil is to be sucked into the pump room; and a discharge port through which the oil is to be sucked from the pump room, the housing includes a first oil passage connected to the discharge port, the motor shaft includes a second oil passage provided in the motor shaft and connected to the first oil passage; and a first through-hole connecting the second oil passage and an outer circumferential surface of the motor shaft, and the suction port is open to a lower region in the vertical direction of the accommodation portion, and allows the oil in the accommodation portion to be sucked into the pump room.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

A Z-axis direction illustrated in each drawing is a vertical direction Z in which a positive side is set to an upper side while a negative side is set to a lower side. In the embodiment, the vertical direction Z is an up-and-down direction in each drawing. In the following description, the vertically upper side is simply referred to as an "upper side", and the vertically lower side is simply referred to as a "lower side".

Figure 1:
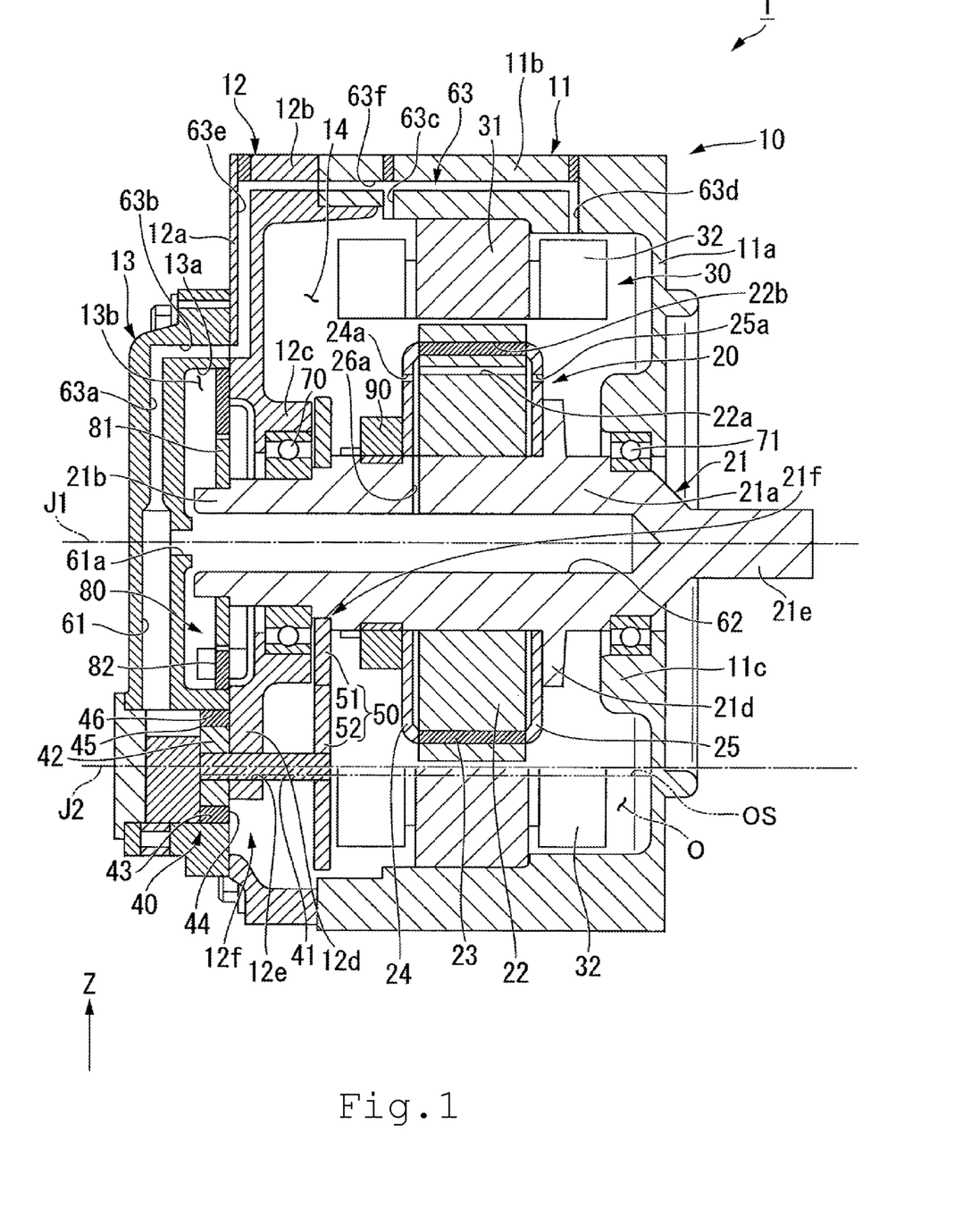
FIG. 1 is a sectional view illustrating a drive device according to an example embodiment of the present disclosure.

As illustrated in FIG. 1, a drive device 1 of the embodiment includes a housing 10, a rotor 20 including a motor shaft 21 disposed along a center axis J1 extending in one direction, a rotation detector 80, a stator 30, a pump 40, a transmission member 50, and bearings 70, 71.

The center axis J1 extends in a lateral direction of FIG. 1. That is, in the embodiment, the lateral direction in FIG. 1 corresponds to one direction. In the following description, a direction parallel to the center axis J1 is simply referred to as an "axial direction", a radial direction centered on the center axis J1 is simply referred to as a "radial direction", and a circumferential direction centered on the center axis J1 is simply referred to as a "circumferential direction". In the axial direction, a left side in FIG. 1 is referred to as "one side in the axial direction", and a right side in FIG. 1 in the axial direction is referred to as "the other side in the axial direction".

The housing 10 includes a main body 11, a first portion 12, and a second portion 13. In the embodiment, the main body 11, the first portion 12, and the second portion 13 are a separate member. The main body 11 has a bottomed tubular shape that is open on one side in the axial direction. The main body 11 includes a bottom unit 11a, a main body tube 11b, and a bearing holder 11c. The bottom unit 11a has an annular plate shape expanding in the radial direction. The main body tube 11b has a cylindrical shape extending from a radially outer edge of the bottom unit 11a toward one side in the axial direction. The bearing holder 11c has a cylindrical shape protruding from an inner edge of the bottom unit 11a toward one side in the axial direction. The bearing holder 11c holds the bearing 71 inside the bearing holder 11c.

The first portion 12 has a covered cylindrical shape that is open on the other side in the axial direction. The first portion 12 is attached to one side in the axial direction of the main body 11. The first portion 12 includes a lid 12a, a first tube 12b, and a bearing holder 12c. The lid 12a has an annular plate shape expanding in the radial direction. The lid 12a covers one side in the axial direction of the stator 30. That is, the first portion 12 covers one side in the axial direction of the stator 30. An opening 12f axially penetrating the lid 12a is provided at a lower end of the lid 12a. That is, the first portion 12 includes the opening 12f axially penetrating the first portion 12.

The first tube 12b has the cylindrical shape extending from the radially outer edge of the lid 12a toward the other side in the axial direction. An end on the other side in the axial direction of the first tube 12b is fixed while contacting with an end on one side in the axial direction of the main body tube 11b. The bearing holder 12c has the cylindrical shape protruding from the inner edge of the lid 12a toward the other side in the axial direction. The bearing holder 12c holds the bearing 70 inside the bearing holder 12c. That is, the first portion 12 holds the bearing 70.

A accommodation unit 14 surrounded by the main body 11 and the first portion 12 is formed by fixing the main body 11 and the first portion 12 to each other. That is, the housing 10 includes the accommodation unit 14. The accommodation unit 14 can store oil O while accommodating the rotor 20 and the stator 30. The oil O is stored in a lower region of the accommodation unit 14. As used herein, "the lower region of the accommodation unit" includes a portion located below a center in the vertical direction Z of the accommodation unit.

In the embodiment, a liquid level OS of the oil O stored in the accommodation unit 14 is located above the opening 12f. The liquid level OS of the oil O fluctuates by sucking up the oil O using the pump 40, but is disposed below the rotor 20 at least when the rotor 20 rotates. Consequently, when the rotor 20 rotates, the oil O can be prevented from becoming rotational resistance of the rotor 20.

The second portion 13 is attached to one side in the axial direction of the first portion 12. The second portion 13 includes a recess 13a recessed from a surface on the other side in the axial direction of the second portion 13 toward one side in the axial direction. The recess 13a axially overlaps the bearing holder 12c. The recess 13a is closed by a surface on one side in the axial direction of the first portion 12, namely, the surface on one side in the axial direction of the lid 12a. This allows formation of a space 13b surrounded by an inside surface of the recess 13a and the surface on one side in the axial direction of the first portion 12. The center axis J1 passes through the space 13b.

Figure 2:
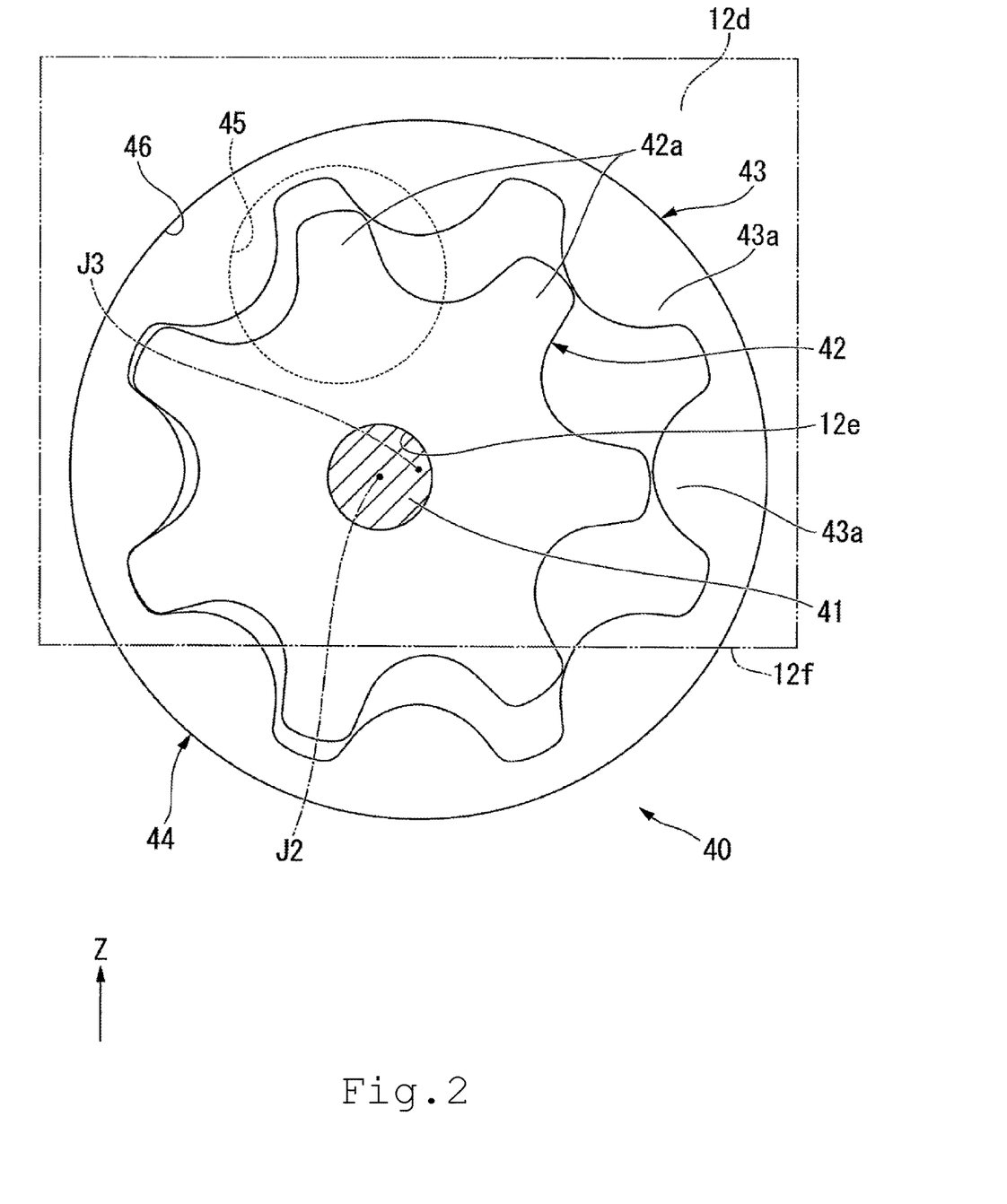
FIG. 2 is a view illustrating a pump of an example embodiment of the present disclosure when the pump is viewed from the other side in an axial direction.

A pump room 46 is provided in the second portion 13. That is, the pump room 46 is provided in the housing 10. The pump room 46 is recessed from the surface on the other side in the axial direction of the second portion 13 toward one side in the axial direction. More particularly, the pump room 46 is recessed from the surface on the other side in the axial direction at a lower end of the second portion 13 toward one side in the axial direction. As illustrated in FIG. 2, an outer shape of the pump room 46 viewed along the axial direction is a circular shape. The pump room 46 accommodates an internal gear 43 and an external gear 42 (to be described later).

As illustrated in FIG. 1, an upper portion of the opening on the other side in the axial direction of the pump room 46 is closed by an end face on the one side in the axial direction of the lid 12a. That is, the first portion 12 includes a closing unit 12d that closes a part of the opening on the other side in the axial direction of the pump room 46. In the embodiment, the closing unit 12d is a part of the lower portion of the lid 12a. The closing unit 12d includes a sliding bearing unit 12e axially penetrating the closing unit 12d. The sliding bearing unit 12e is located between the pump room 46 and the accommodation unit 14 in the axial direction. An end on one side in the axial direction of the sliding bearing unit 12e is open to the pump room 46. An end on the other side in the axial direction of the sliding bearing unit 12e is open to the accommodation unit 14. At least a part of the sliding bearing unit 12e is disposed below the liquid level OS of the oil O stored in the accommodation unit 14. In FIG. 1, the lower portion of the sliding bearing unit 12e is disposed below the liquid level OS. As illustrated in FIG. 2, the outer shape of the sliding bearing unit 12e viewed in the axial direction is a circular shape. In the embodiment, the sliding bearing unit is constructed with the same member as the first portion 12. Alternatively, the first portion 12 may include a sliding bearing support unit supporting the sliding bearing, and a sliding bearing member such as a sintered oil retaining bearing may be held.

The lower end of the pump room 46 axially overlaps the opening 12f. Consequently, the lower end of the pump room 46 faces the accommodation unit 14 with the opening 12f interposed therebetween. The lower end of the pump room 46 facing the accommodation unit 14 is a suction port 44. That is, the opening 12f exposes the suction port 44 to the accommodation unit 14. In the embodiment, the pump room 46 is easily formed because the second portion 13 is a member separate from the first portion 12.

As illustrated in FIG. 1, the housing 10 includes a first oil passage 61 and a third oil passage 63. In the embodiment, the first oil passage 61 is provided in the second portion 13. The first oil passage 61 extends in the vertical direction Z. The first oil passage 61 extends from a position axially overlapping the upper end of the pump room 46 to the upper side above the center axis J1. The first oil passage 61 is disposed on one side in the axial direction of the recess 13a. The first oil passage 61 is connected to the space 13b though a connection hole 61a. For example, the connection hole 61a is a circular hole centered on the center axis J1. The lower end of the first oil passage 61 is connected to the upper end of the pump room 46 from one side in the axial direction. A portion to which the first oil passage 61 in the pump room 46 is connected is a discharge port 45. That is, the first oil passage 61 is connected to the discharge port 45.

Figure 3:
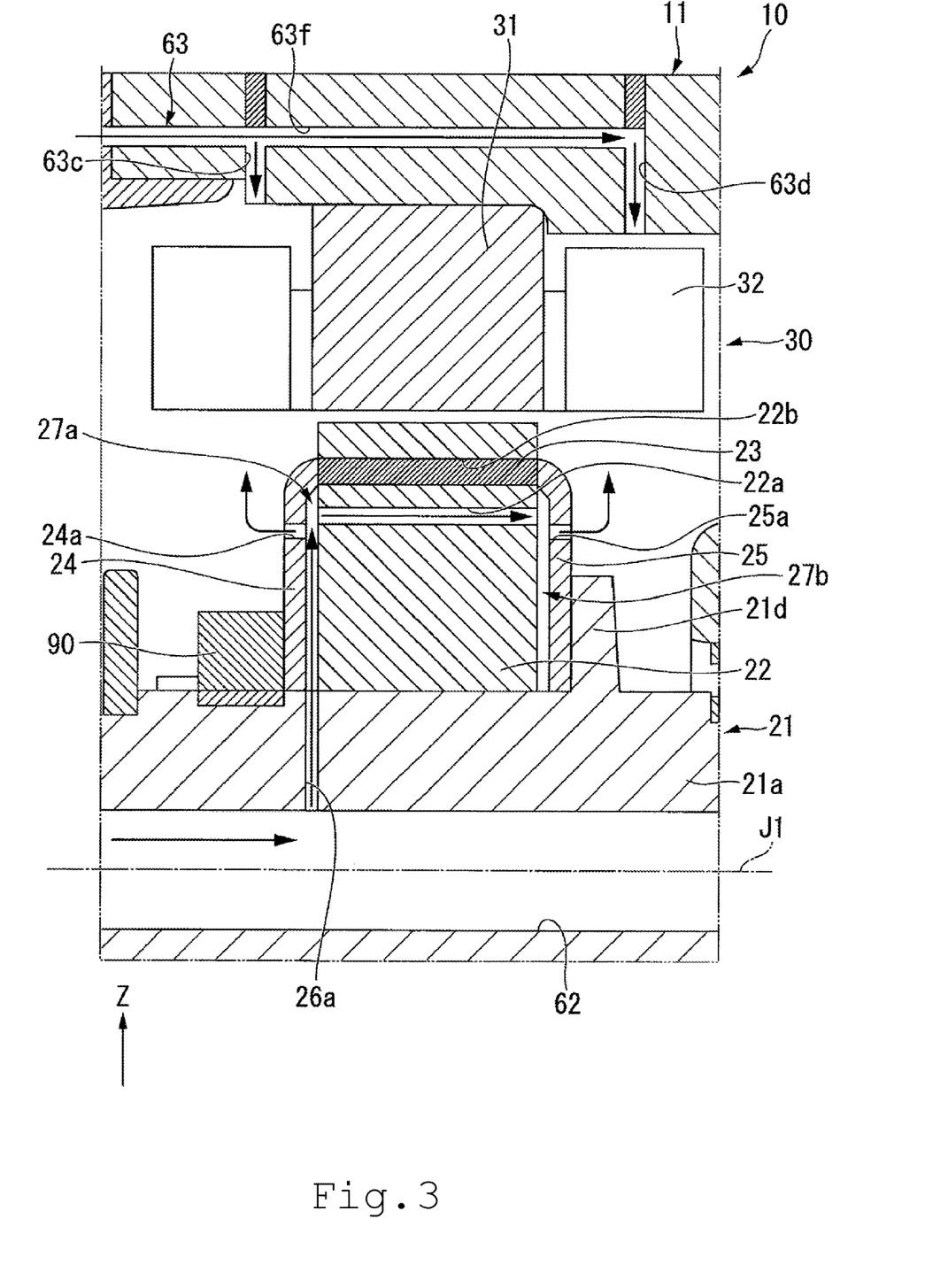
FIG. 3 is a sectional view illustrating a portion of a drive device of an example embodiment of the present disclosure.

The third oil passage 63 is provided across the second portion 13, the first portion 12, and the main body 11. As illustrated in FIGS. 1 and 3, the third oil passage 63 includes a first extension unit 63a, a second extension unit 63b, a third extension unit 63e, a fourth extension unit 63f, and supply units 63c, 63d.

As illustrated in FIG. 1, the first extension unit 63a extends in the vertical direction Z from the upper end of the first oil passage 61. Consequently, the third oil passage 63 is connected to the first oil passage 61. The upper end of the first extension unit 63a is located at the upper end of the second portion 13. The second extension unit 63b extends from the upper end of the first extension unit 63a toward the other side in the axial direction. An end on the other side in the axial direction of the second extension unit 63b is located in the lid 12a. The third extension unit 63e extends upward from the end on the other side in the axial direction of the second extension unit 63b. The upper end of the third extension unit 63e is located at the upper end of the lid 12a. The fourth extension unit 63f extends from the upper end of the third extension unit 63e toward the other side in the axial direction. The fourth extension unit 63f is provided to extend from the lid 12a to the first tube 12b and the main body tube 11b. The fourth extension unit 63f extends to the other side in the axial direction with respect to a stator core 31.

As illustrated in FIG. 3, the supply units 63c, 63d extend downward from the fourth extension unit 63f. The supply units 63c, 63d are provided in the main body tube 11b. The supply units 63c, 63d are open to an inner circumferential surface of the main body tube 11b. Consequently, the supply units 63c, 63d are open to the accommodation unit 14. The supply unit 63c is disposed on one side in the axial direction with respect to the stator core 31. The supply unit 63d is disposed on the other side in the axial direction with respect to the stator core 31. The supply units 63c, 63d are radially opposed to each other on the upper side of a coil 32 with a gap interposed therebetween. That is, the third oil passage 63 is open to the accommodation unit 14 on the upper side of the stator 30. The supply unit 63d extends radially inward from the end on the other side in the axial direction of the second extension unit 63b.

In the embodiment, the third oil passage 63 is provided across the second portion 13, the first portion 12, and the main body 11, which are the separate member, so that the oil passages of the first extension unit 63a, the second extension unit 63b, and the like, which constitute the third oil passage 63, are easily processed.

As illustrated in FIG. 1, the rotor 20 includes a motor shaft 21, a rotor core 22, a magnet 23, a first end plate 24, and a second end plate 25. The motor shaft 21 has the cylindrical shape extending in the axial direction. The motor shaft 21 includes a large diameter unit 21a, a small diameter unit 21b, and an output unit 21e.

The large diameter unit 21a is a portion to which the rotor core 22 is attached. The end on the other side in the axial direction of the large diameter unit 21a is journaled by the bearing 71. The small diameter unit 21b is connected to the large diameter unit 21a on one side in the axial direction of the large diameter unit 21a. The end on one side in the axial direction of the small diameter unit 21b is the end on one side in the axial direction of the motor shaft 21. The end on one side in the axial direction of the small diameter unit 21b is inserted into the space 13b. An outer diameter of the small diameter unit 21b is smaller than an outer diameter of the large diameter unit 21a. The end on the other side in the axial direction of the small diameter unit 21b is journaled by the bearing 70. The motor shaft 21 is journaled by the bearings 70, 71. For example, the bearings 70, 71 are a ball bearing.

The output unit 21e is connected to the large diameter unit 21a on the other side in the axial direction of the large diameter unit 21a. The output unit 21e is the end on the other side in the axial direction of the motor shaft 21. The outer diameter of the output unit 21e is smaller than the outer diameters of the large diameter unit 21a and the small diameter unit 21b. The output unit 21e axially penetrates the bottom unit 11a to protrude to the outside of the housing 10.

The motor shaft 21 includes a flange 21d. The flange 21d protrudes radially outward from an outer circumferential surface of the large diameter unit 21a. The flange 21d has an annular plate shape provided over a whole circumference of the outer circumferential surface of the large diameter unit 21a. The flange 21d is provided in a portion close to the other side in the axial direction of the large diameter unit 21a. A male screw portion is provided on the outer circumferential surface of the portion close to one side in the axial direction of the large diameter unit 21a. A nut 90 is tightened to the male screw portion of the large diameter unit 21a.

The motor shaft 21 includes a second oil passage 62 provided in the motor shaft 21. The second oil passage 62 is a bottomed hole that is recessed from the end on one side in the axial direction of the motor shaft 21 toward the other side in the axial direction. The second oil passage 62 extends from the end on one side in the axial direction of the small diameter unit 21b to the end on the other end in the axial direction of the large diameter unit 21a. In the embodiment, the inner circumferential surface of the second oil passage 62 has the cylindrical shape centered on the center axis J1. The second oil passage 62 is open to one side in the axial direction. The end on one side in the axial direction of the second oil passage 62 is axially opposed to the connection hole 61a. The second oil passage 62 is connected to the first oil passage 61 through the connection hole 61a.

The motor shaft 21 includes a first through-hole 26a connecting the second oil passage 62 and the outer circumferential surface of the motor shaft 21. The first through-hole 26a extends in the radial direction. The first through-hole 26a is provided in the large diameter unit 21a. Although not illustrated, a plurality of the first through-holes 26a is provided along, for example, the circumferential direction.

The rotor 22 has annular shape fitted in the motor shaft 21. The rotor core 22 includes a rotor through-hole 22a axially penetrating the rotor core 22 and a magnet insertion hole 22b axially penetrating the rotor core 22. The rotor through-hole 22a is disposed radially inward with respect to the magnet insertion hole 22b. A plurality of magnet insertion holes 22b is provided along the circumferential direction. The magnet 23 is inserted into the magnet insertion hole 22b.

The first end plate 24 and the second end plate 25 have the annular plate shape expanding in the radial direction. The large diameter unit 21a is inserted into the first end plate 24 and the second end plate 25. The first end plate 24 and the second end plate 25 axially sandwich the rotor core 22 while contacting with the rotor core 22.

As illustrated in FIG. 3, the first end plate 24 is disposed on one side in the axial direction of the rotor core 22. The outer edge in the radial direction of the first end plate 24 is curved toward the other side in the axial direction, and contacts with the outer edge in the radial direction in the surface on one side in the axial direction of the rotor core 22. The outer edge in the radial direction of the first end plate 24 axially overlaps the opening on one side in the axial direction of the magnet insertion hole 22b, and presses the magnet 23 inserted into the magnet insertion hole 22b from one side in the axial direction. A radially inside portion with respect to the outer edge in the radial direction of the first end plate 24 is axially opposed to the surface on one side in the axial direction of the rotor core 22 with a gap 27a interposed therebetween. The radially outside end of the first through-hole 26a is open to the gap 27a. The first end plate 24 includes an exhaust hole 24a axially penetrating the first end plate 24. The exhaust hole 24a is disposed radially inside the rotor through-hole 22a and radially outside the nut 90.

The second end plate 25 is disposed on the other side in the axial direction of the rotor core 22. The outer edge in the radial direction of the second end plate 25 is curved toward one side in the axial direction, and contacts with the outer edge in the radial direction in the surface on the other side in the axial direction of the rotor core 22. The outer edge in the radial direction of the second end plate 25 axially overlaps the opening on the other side in the axial direction of the magnet insertion hole 22b, and presses the magnet 23 inserted into the magnet insertion hole 22b from the other side in the axial direction. Consequently, both sides in the axial direction of the magnet 23 inserted into the magnet insertion hole 22b are pressed by the first end plate 24 and the second end plate 25. Thus, the magnet 23 can be prevented from coming out of the magnet insertion hole 22b.

A radially inside portion with respect to the outer edge in the radial direction of the second end plate 25 is axially opposed to the surface on the other side in the axial direction of the rotor core 22 with a gap 27b interposed therebetween. The gap 27b is connected to the gap 27a between the first end plate 24 and the rotor core 22 through the rotor through-hole 22a. The second end plate 25 includes an exhaust hole 25a axially penetrating the second end plate 25. The exhaust hole 25a is disposed radially inside the rotor through-hole 22a and radially outside the flange 21d. For example, the radial position of the exhaust hole 25a is, for example, identical to the radial position of the exhaust hole 24a.

The first end plate 24, the rotor core 22, and the second end plate 25 are axially held by the nut 90 and the flange 21d. The nut 90 is tightened into the male screw portion of the large diameter unit 21a, which allows the nut 90 to press the first end plate 24, the rotor core 22, and the second end plate 25 against the flange 21d. Consequently, the first end plate 24, the rotor core 22, and the second end plate 25 are fixed to the large diameter unit 21a.

The rotation detector 80 in FIG. 1 detects rotation of the rotor 20. In the embodiment, for example, the rotation detector 80 is a Variable Reluctance (VR) type resolver. The rotation detector 80 is disposed in the space 13b. The rotation detector 80 includes a detection target unit 81 and a sensor 82. The detection target unit 81 has an annular shape extending in the circumferential direction. The detection target unit 81 is fitted in and fixed to the small diameter unit 21b. More particularly, the detection target unit 81 is fitted in and fixed to a portion having a smaller outer diameter of a step provided in the small diameter unit 21b. In the step, the outer diameter is decreased from the other side in the axial direction toward one side in the axial direction. The detection target unit 81 is made of a magnetic material.

The sensor 82 is fixed to the surface on one side in the axial direction of the lid 12a. The sensor 82 has the annular shape surrounding the radial outside of the detection target unit 81. The sensor 82 includes a plurality of coils along the circumferential direction. When the detection target unit 81 rotates together with the motor shaft 21, an induced voltage is generated in the coil of the sensor 82 according to the circumferential position of the detection target unit 81. The sensor 82 detects the rotation of the detection target unit 81 by detecting the induced voltage. Consequently, the rotation detector 80 detects the rotation of the motor shaft 21, and detects the rotation of the rotor 20.

The stator 30 is radially opposed to the rotor 20 with the gap interposed therebetween. The stator 30 includes the stator core 31 and the plurality of coils 32 mounted on the stator core 31. The stator core 31 has the annular shape centered on the center axis J1. The outer circumferential surface of the stator core 31 is fixed to the inner circumferential surface of the main body tube 11b. The stator core 31 is opposed to the radial outside of the rotor core 22 with the gap interposed therebetween.

The pump 40 is disposed at the lower end of the second portion 13. The pump 40 includes a pump shaft 41, an external gear 42, an internal gear 43, the pump room 46, the suction port 44, and the discharge port 45. The pump shaft 41 is disposed along a pump axis J2 that is different from the center axis J1 in the housing 10. In the embodiment, the pump axis J2 is parallel to the center axis J1. That is, the pump shaft 41 extends in the axial direction of the motor shaft 21. The pump axis J2 is located below the center axis J1.

The pump shaft 41 is disposed below the motor shaft 21 on one side in the axial direction with respect to the stator 30. For this reason, the motor shaft 21 and the pump shaft 41 are disposed at a position where the motor shaft 21 and the pump shaft 41 at least partially overlap each other in the direction orthogonal to the axial direction, which allows the drive device 1 to be easily downsized in the axial direction as compared with the case that the motor shaft 21 and the pump shaft 41 are coaxial to each other. In FIG. 1, the motor shaft 21 and the pump shaft 41 overlap each other in the vertical direction Z. In the embodiment, as described above, the pump room 46 and the first oil passage 61 are provided in the second portion 13. Consequently, the pump 40 can collectively be disposed on one side in the axial direction with respect to the stator 30, and the drive device 1 can more easily be downsized in the axial direction. Because the pump shaft 41 extends in the axial direction of the motor shaft 21, the drive device 1 is easily downsized in the radial direction as compared with the case that the pump shaft 41 is inclined with respect to the motor shaft 21.

The pump shaft 41 is disposed in the accommodation unit 14. The end on one side in the axial direction of the pump shaft 41 is inserted into the pump room 46 through the sliding bearing unit 12e. The portion of the pump shaft 41 inserted into the sliding bearing unit 12e is supported by the sliding bearing unit 12e. Consequently, the pump shaft 41 is journaled about the pump axis J2 by the sliding bearing unit 12e. In this way, in the embodiment, the pump shaft 41 can be supported with a simple configuration.

As described above, in the embodiment, at least a part of the sliding bearing unit 12e is disposed below the liquid level OS of the oil O. For this reason, the oil O flows between the sliding bearing unit 12e and the pump shaft 41. Consequently, the oil O can be used as a lubricating oil for the sliding bearing unit 12e, and the pump shaft 41 can suitably be journaled by the sliding bearing unit 12e.

The external gear 42 is a gear that is rotatable around the pump axis J2. The external gear 42 is fixed to the end on one side in the axial direction of the pump shaft 41, and is accommodated in the pump room 46. As illustrated in FIG. 2, the external gear 42 includes a plurality of teeth 42a on the outer circumferential surface of the external gear 42. A tooth shape of the tooth 42a of the external gear 42 is a trochoidal tooth shape.

The internal gear 43 is an annular gear that is rotatable about a rotation axis J3 eccentric to the pump axis J2. The internal gear 43 is accommodated in the pump room 46. The internal gear 43 surrounds the external gear 42, and meshes with the external gear 42. The internal gear 43 has a plurality of teeth 43a on the inner circumferential surface of the internal gear 43. The tooth shape of the tooth 43a of the internal gear 43 is the trochoidal tooth shape. In this way, the tooth 42a of the external gear 42 and the tooth 43a of the internal gear 43 have the trochoidal tooth shape, so that a trochoid pump can be constructed. Thus, noise generated from the pump 40 can be reduced, and pressure and an amount of oil O discharged from the pump 40 can easily be stabilized.

As described above, the suction port 44 is the portion of the pump room 46 exposed to the inside of the accommodation unit 14 through the opening 12f. In the embodiment, the suction port 44 has a bow shape protruding downward. The suction port 44 is open to the lower region of the accommodation unit 14, and allows the oil O stored in the accommodation unit 14 to be sucked into the pump room 46. In the embodiment, the suction port 44 is disposed below the rotor 20. At least a part of the suction port 44 is disposed below the liquid level OS of the oil O stored in the accommodation unit 14. In FIG. 1, the whole suction port 44 is disposed below the liquid level OS of the oil O. As illustrated in FIG. 1, in the embodiment, the suction port 44 is open to the lower end of the accommodation unit 14. As described above, the discharge port 45 is the portion that is open to the first oil passage 61 in the pump room 46. The discharge port 45 is open to one side in the axial direction of the pump room 46. The discharge port 45 allows the oil O to be discharged from the pump room 46.

The transmission member 50 has a first gear 51 and a second gear 52. The first gear 51 is a disc-shaped gear that is rotatable about the axis parallel to the axial direction. The first gear 51 is fixed to the end on one side in the axial direction of the large diameter unit 21a. More particularly, the first gear 51 is fitted in and fixed to a portion having a smaller outer diameter of a step 21f provided at the end on one side in the axial direction of the large diameter unit 21a.

In the step 21f, the outer diameter is decreased from the other side in the axial direction toward one side in the axial direction. The first gear 51 rotates around the center axis J1 together with the motor shaft 21. The first gear 51 is axially sandwiched between a left step surface of the step of the large diameter unit 21a and the bearing 70.

The second gear 52 is the disc-shaped gear that is rotatable about the axis parallel to the axial direction. The second gear 52 meshes with the first gear 51 on the lower side of the first gear 51. The second gear 52 is fixed to the end on the other side in the axial direction of the pump shaft 41. Both the second gear 52 rotates about the pump axis J2 together with the pump shaft 41. When the first gear 51 rotates in association with the rotation of the motor shaft 21, the second gear 52 meshing with the first gear 51 rotates, and the pump shaft 41 rotates. Consequently, the transmission member 50 transmits the rotation of the motor shaft 21 to the pump shaft 41.

When the rotor 20 rotates to rotate the motor shaft 21, the pump shaft 41 rotates through the transmission member 50, and the external gear 42 rotates. Consequently, the internal gear 43 meshing with the external gear 42 rotates to send the oil O sucked from the suction port 44 into the pump room 46 to the discharge port 45 through between the external gear 42 and the internal gear 43. In this way, the pump 40 is driven through the motor shaft 21. A part of the oil O discharged from the discharge port 45 flows into the second oil passage 62 through the first oil passage 61. As indicated by an arrow in FIG. 3, the oil O flowing into the second oil passage 62 receives radially outside force due to centrifugal force of the rotating motor shaft 21, and flows to the outside of the motor shaft 21 through the first through-hole 26a.

In the embodiment, because the first through-hole 26a is open in the axial gap 27a between the first end plate 24 and the rotor core 22, the oil O flowing out from the first through-hole 26a flows into the gap 27a. A part of the oil O flowing into the gap 27a is exhausted radially outward from the exhaust hole 24a. On the other hand, another part of the oil O flowing into the gap 27a flows into the gap 27b through the rotor through-hole 22a. The oil O flowing into the gap 27b is exhausted radially outward from the exhaust hole 25a. The oil O exhausted radially outward from the exhaust holes 24a, 25a is blown onto the coil 32. This enables the oil O to cool the coil 32. The second oil passage 62 is provided in the motor shaft 21, so that the rotor 20 can also be cooled by the oil O until the oil O is exhausted from the exhaust holes 24a, 25a. In particular, the magnet 23 can be cooled, so that demagnetization of the magnet 23 can be prevented.

FIG. 3 illustrates an example in which the oil O is exhausted upward from the exhaust holes 24a, 25a. However, the present invention is not limited to this configuration. Because the rotor 20 rotates, a circumferential positions of the exhaust holes 24a, 25a change in association with the rotation of the rotor 20. Consequently, the direction of the oil O exhausted from the exhaust holes 24a, 25a changes in the circumferential direction, and the plurality of coils 32 arranged along the circumferential direction can be cooled by the oil O.

Another part of the oil O discharged from the discharge port 45 flows into the third oil passage 63 through the first oil passage 61 and the space 13b. The oil O flowing into the third oil passage 63 flows out from the supply units 63c, 63d, and is supplied to the coil 32. This enables the oil O to further cool the coil 32. In the embodiment, because the third oil passage 63 is open to the accommodation unit 14 on the upper side of the stator 30, the oil O flowing out from the third oil passage 63 is supplied to the stator 30 from the upper side. Consequently, the oil O can be supplied from the upper side to the lower side of the stator 30, and the whole stator 30 is easily cooled by the oil O.

As described above, the pump 40 can be driven by the rotation of the motor shaft 21, and the oil O stored in the housing 10 can be sucked up by the pump 40, and supplied to the rotor 20 and the stator 30. This allows the rotor 20 and the stator 30 to be cooled using the oil O stored in the housing 10. The oil O supplied to the stator 30 drops in the accommodation unit 14, and is stored in the lower region of the accommodation unit 14 again. This allows circulation of the oil O in the accommodation unit 14.

In the embodiment, the suction port 44 through which the oil O is sucked into the pump room 46 is open to the lower region of the accommodation unit 14 in which the oil O is stored. This enables the suction port 44 to be directly exposed to the oil O stored in the accommodation unit 14. This eliminates need for the oil passage that leads the oil stored in the accommodation unit 14 into the pump room 46. Thus, complication of the oil passage through which the oil O is sent by the pump 40 can be prevented to easily simplify the structure of the drive device 1 including the pump 40. Consequently, in the embodiment, the drive device 1 can be downsized.

In the embodiment, the suction port 44 is disposed below the rotor 20, so that the suction port 44 is easily disposed below the liquid level OS of the oil O. Consequently, the oil O is easily sucked from the suction port 44 into the pump room 46. Even if the liquid level OS is disposed below the rotor 20, the suction port 44 can be disposed below the liquid level OS. This enables the oil O to be easily sucked from the suction port 44 while the liquid level OS is located below the rotor 20 and the oil O is prevented from becoming the rotational resistance of the rotor 20.

In the embodiment, at least a part of the suction port 44 is disposed below the liquid level OS of the oil O, so that the suction port 44 is more easily exposed to the oil O stored in the accommodation unit 14. This allows the oil O to be more easily sucked from the suction port 44 into the pump room 46.

In the embodiment, the closing unit 12d that closes a part of the opening on the other side in the axial direction of the pump room 46 can be formed as a part of the first portion 12, so that a part of the opening on the other side in the axial direction of the pump room 46 can be closed by attaching the second portion 13 to the first portion 12. Consequently, there is no need to separately provide a member that closes the pump room 46, and the number of components of the drive device 1 can easily be decreased. The suction port 44 of the pump room 46 can easily be exposed to the accommodation unit 14 by providing the opening 12f in the first portion 12.

The present invention is not limited to the above embodiment, but other configurations may be adopted. The closing unit 12d may be provided in the second portion 13. The pump room 46 may be provided in the first portion 12. In this case, the pump room 46 is recessed from the surface on one side in the axial direction of the first portion 12 toward the other side in the axial direction. The first portion 12 and the second portion 13 may be constructed with a single member.

The rotor core 22 may be fixed to the outer circumferential surface of the motor shaft 21 by press fitting or the like. In this case, the first end plate 24 and the second end plate 25 may not be provided. In this case, the oil O flowing out from the first through-hole 26a may directly be supplied to the coil 32, or a hole connected to the first through-hole 26a may be provided in the rotor core 22 to supply the oil O to the coil 32 through the hole of the rotor core 22. The oil O may be supplied to the stator core 31. The third oil passage 63 may not be provided.

The pump shaft 41 may be inclined with respect to the motor shaft 21. The sliding bearing unit 12e may be located above the liquid level OS. The pump shaft 41 may be journaled by a ball bearing. The tooth 42a of the external gear 42 and the tooth 43a of the internal gear 43 may have a cycloid tooth shape or an involute tooth shape.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A drive device comprising:
    a rotor including a motor shaft provided along a center axis extending in one direction;
    a stator radially opposed to the rotor with a gap interposed between the stator and the rotor;
    a housing including an accommodation portion to store oil and accommodate the rotor and the stator;
    a pump including a pump shaft provided along an axis different from the center axis in the housing, the pump being driven through the motor shaft;
    a transmission that transmits rotation of the motor shaft to the pump shaft; and
    a rotation detector that detects a rotation of the rotor; wherein
    the pump includes:
        an external gear fixed to the pump shaft;
        an internal gear surrounding the external gear and meshing with the external gear;
        a pump room provided in the housing and accommodating the internal gear and the external gear;
        a suction port through which the oil is to be suctioned into the pump room; and
        a discharge port through which the oil is to be discharged from the pump room;
    the housing includes a first oil passage connected to the discharge port;
    the motor shaft includes:
        a second oil passage provided in the motor shaft and connected to the first oil passage; and
        a first through-hole connecting the second oil passage and an outer circumferential surface of the motor shaft;
    the suction port is open to a lower region of the accommodation portion in the vertical direction and allows the oil in the accommodation portion to be suctioned into the pump room;
    the rotation detector is on one side of the rotor core in the axial direction and is fitted in and fixed to the rotor shaft;
    the first oil passage is on one side of the motor shaft in the axial direction and includes a connection hole;
    an end of the second oil passage on the one side of the motor shaft in the axial direction is axially opposed to the connection hole; and
    the second oil passage is connected to the first oil passage through the connection hole.

2. The drive device according to claim 1, wherein the suction port is disposed below the rotor in a vertical direction.

3. The drive device according to claim 1, wherein at least a portion of the suction port is disposed below a liquid surface of the oil in the accommodation portion in the vertical direction.

4. The drive device according to claim 3, wherein the liquid surface of the oil in the accommodation portion is disposed below the rotor in the vertical direction during rotation of the rotor.

5. The drive device according to claim 1, wherein the housing includes:
    a first portion that holds a bearing journaling the motor shaft and covers one side in an axial direction of the stator; and
    a second portion attached to one side in the axial direction of the first portion, the pump room being provided in the second portion;
    the pump room is recessed from a surface on the other side in the axial direction of the second portion toward one side in the axial direction; and
    the first portion includes:
        a cover that closes a portion of an opening on the other side in the axial direction of the pump room; and
        an opening axially penetrating the first portion to expose the suction port to the accommodation portion.

6. The drive device according to claim 5, wherein
    the cover includes a sliding bearing axially penetrating the cover;
    the sliding bearing is axially located between the pump room and the accommodation portion; and
    the pump shaft is journaled by the sliding bearing.

7. The drive device according to claim 6, wherein at least a portion of the sliding bearing is disposed below the liquid level of the oil in the accommodation portion in the vertical direction.

8. The drive device according to claim 5, wherein
    the pump shaft extends in the axial direction of the motor shaft, and is disposed below the motor shaft in the vertical direction on one side in the axial direction with respect to the stator; and
    the first oil passage is provided in the second portion.

9. The drive device according to claim 1, wherein
    the housing includes a third oil passage connected to the first oil passage; and
    the third oil passage is open to the accommodation portion on an upper side in the vertical direction of the stator.

10. The drive device according to claim 1, wherein a tooth of the external gear and a tooth of the internal gear have a trochoidal tooth shape.

* * * * *